US006970056B2

(12) United States Patent
Atokawa et al.

(10) Patent No.: US 6,970,056 B2
(45) Date of Patent: Nov. 29, 2005

(54) FILTER ASSEMBLY AND COMMUNICATION APPARATUS

(75) Inventors: Masayuki Atokawa, Kanazawa (JP); Hirofumi Miyamoto, Kanazawa (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 305 days.

(21) Appl. No.: 10/163,843

(22) Filed: Jun. 5, 2002

(65) Prior Publication Data

US 2002/0180558 A1 Dec. 5, 2002

(30) Foreign Application Priority Data

Jun. 5, 2001 (JP) ....................................... 2001-169171
Apr. 12, 2002 (JP) ....................................... 2002-110193

(51) Int. Cl.[7] ............................ H01P 1/205; H04B 1/40

(52) U.S. Cl. .................... 333/132; 333/101; 445/180.4; 445/78; 445/90.2; 445/553.1

(58) Field of Search ................................ 333/132, 101; 455/78, 180.4, 90.2, 553.1, 101, 275, 82, 83, 552.1

(56) References Cited

U.S. PATENT DOCUMENTS 2,439,408 A * 4/1948 Mitchell .................... 455/90.2
2,533,493 A * 12/1950 Mitchell ...................... 455/78
3,054,924 A * 9/1962 Wetzger et al. ............... 314/71
3,181,117 A * 4/1965 Sloughter ................ 340/854.1
3,275,958 A * 9/1966 Rehm et al. .................... 334/3
3,523,237 A * 8/1970 Toshiyuki et al. ............ 363/60
5,241,693 A 8/1993 Kim et al.
5,544,903 A * 8/1996 Bears .......................... 280/18
5,625,894 A * 4/1997 Jou ............................. 455/78
5,715,525 A 2/1998 Tarusawa et al.
5,809,405 A * 9/1998 Yamaura .................... 455/101

FOREIGN PATENT DOCUMENTS

CN 1195230 A 10/1998
EP 0 641 090 A2 3/1995
JP 7-79204 8/1995
JP 2602121 1/1997

OTHER PUBLICATIONS

Copy of The People's Republic of China Office Action dated Mar. 5, 2004 (and English translation of same).

* cited by examiner

*Primary Examiner*—Michael Tokar
*Assistant Examiner*—Lam T. Mai
(74) *Attorney, Agent, or Firm*—Dickstein, Shapiro, Morin & Oshinsky, LLP.

(57) ABSTRACT

A filter assembly includes a transmission filter, a reception filter, a change-over switch, and phase circuits. The transmission filter has first and second ends electrically connected to a first antenna terminal and a transmission terminal, respectively. The reception filter has a first end electrically connected to a second antenna terminal via the change-over switch, and a second end electrically connected to a reception terminal. A main antenna is connected to the first antenna terminal, and a diversity antenna is connected to the second antenna terminal. The change-over switch performs switching control to connect the reception filter to one of the first and second antenna terminals. Thus, the filters utilize a fixed number of resonators regardless of switching control of the change-over switch, thereby achieving optimum filter characteristics.

16 Claims, 9 Drawing Sheets

FILTER ASSEMBLY AND COMMUNICATION APPARATUS

BACKGROUND OF THE INVENTION

1. Field of the Invention

The present invention relates to a filter assembly and a communication apparatus used in the microwave band.

2. Description of the Related Art

A diversity-enabled CDMA (code division multiple access) cellular telephone system requires simultaneous transmission/reception communication. In an electric circuit for RF components in a cellular telephone terminal device, filter assemblies are typically formed of a combination of a shared antenna unit and a diversity-enabled reception filter. However, this requires a great number of filters, thus preventing the cellular telephone terminal device from being reduced in size.

In order to solve the above-described problem, as described in Japanese Examined Patent Application Publication No. 7-79204 and in Japanese Patent No. 2602121, a diversity-enabled communication apparatus has been suggested which incorporates a filter having two antenna terminals without increasing the number of filters.

However, there has been a problem associated with a reception filter of a communication apparatus of this type in that a different number of resonators are required depending upon whether the reception filter is connected to the first antenna (or a main antenna) or the second antenna (or a diversity antenna). Specifically, when connected to the first antenna, the reception filter requires one resonator more than when connected to the second antenna. For example, when connected to the second antenna, the reception filter is a band-pass filter having three resonators, while the reception filter is a band-pass filter having four resonators when connected to the first antenna. If the reception filter is optimally designed on the basis of the state when the filter is connected to the second antenna, the attenuation amount is excessively high and the insertion loss is high because the reception filter requires a greater number of resonators when connected to the first antenna.

If the reception filter is optimally designed on the basis of the state when the filter is connected to the first antenna, the attenuation amount is insufficient because the reception filter requires too few a number of resonators when connected to the second antenna. If the reception filter is optimally designed as a four-stage band-pass filter, the reception filter has a larger insertion loss and a larger size than a reception filter which is optimally designed as a three-stage band-pass filter.

Accordingly, the reception filter of the communication apparatus described in Japanese Examined Patent Application Publication 7-79204 and Japanese Patent No. 2602121 requires a different number of resonators and has different electric characteristics depending upon whether the reception filter is connected to the first antenna or the second antenna. It is thus difficult to optimize the filter characteristic. The first antenna serving as a main antenna and the second antenna serving as a diversity antenna have different capabilities, leading to an inconvenient communication apparatus.

SUMMARY OF THE INVENTION

Accordingly, it is an object of the present invention to provide a filter assembly and a communication apparatus in which a filter uses a fixed number of resonators regardless of switching control, thereby achieving optimum filter characteristics.

To this end, in an aspect of the present invention, a filter assembly includes: a first filter; a second filter; first and second input/output terminals electrically connected to first and second input/output ends of the first filter, respectively; and third and fourth input/output terminals electrically connected to first and second input/output ends of the second filter, respectively. The filter assembly is externally connected to a change-over switch for switching between a first state where the first input/output terminal connected to the first filter is electrically connected to the third input/output terminal connected to the second filter so that the first filter and the second filter are combined into a single filter, and a second state where the first input/output terminal connected to the first filter is electrically isolated from the third input/output terminal connected to the second filter so that the first filter and the second filter operate as two discrete filters.

In another aspect of the present invention, a filter assembly includes: a first filter; a second filter; a change-over switch; first and second input/output terminals electrically connected to first and second input/output ends of the first filter, respectively; a third input/output terminal electrically connected to a first input/output end of the second filter via the change-over switch; and a fourth input/output terminal electrically connected to a second input/output end of the second filter. The change-over switch performs switching control to electrically connect the second filter to one of the first input/output terminal and the third input/output terminal, thereby switching between a first state where the first input/output terminal is electrically connected to the first filter and the second filter so that the first filter and the second filter operate as a single filter using the first input/output terminal as a common terminal, and a second state where the second filter is electrically connected to the third input/output terminal so that the first filter and the second filter operate as two discrete filters.

Preferably, at least one of the first filter and the second filter further includes a variable-frequency resonant circuit having a reactance element which is voltage-controlled and electrically connected to a coaxial dielectric resonator. The reactance element may be implemented as a PIN diode or a variable-capacitance diode. The change-over switch may be implemented as a gallium arsenide switch. Preferably, a phase circuit is electrically connected to at least one of the first filter and the second filter.

Accordingly, when the change-over switch performs switching control to electrically connect the first input/output terminal to the first and second filters, the first and second filters can function as a shared antenna unit (a filter having an antenna terminal, a transmission terminal, and a reception terminal). When the change-over switch performs switching control to electrically connect the second filter to the third input/output terminal, the first and second filters can function as two independent filters, such as a transmission filter and a reception filter. In this case, the number of stages in the second filter is always the same regardless of switching control of the change-over switch. Therefore, a filter assembly and a communication apparatus having a filter characteristic optimum to a desired specification are provided.

The first filter and the second filter may be incorporated in a single dielectric block, or may be incorporated in discrete dielectric blocks. When the first and second filter are built in a single dielectric block, the dielectric block preferably has a ground hole or a recess covered with a conductor on an internal wall surface thereof so as to extend between the first filter and the second filter in order to prevent unwanted electromagnetic coupling between the first and second filters.

In another aspect of the present invention, a communication apparatus includes a filter assembly having the foregoing features. More specifically, the communication apparatus includes a first filter; a second filter; a change-over switch; a first antenna electrically connected to the first filter; and a second antenna electrically connected to the second filter via the change-over switch. The change-over switch performs switching control to electrically connect the second filter to one of the first antenna and the second antenna, thereby switching between a first state where the first antenna is electrically connected to the first filter and the second filter so that the first filter and the second filter operate as a single filter using the first antenna as a common antenna, and a second state where the second filter is electrically connected to the second antenna so that the first filter and the second filter operate as two discrete filters. With this, superior high-frequency characteristics can be achieved.

DESCRIPTION OF THE PREFERRED EMBODIMENTS

A filter assembly and a communication apparatus according to embodiments of the present invention are now described with reference to the accompanying drawings.

First Embodiment

Figure 1:
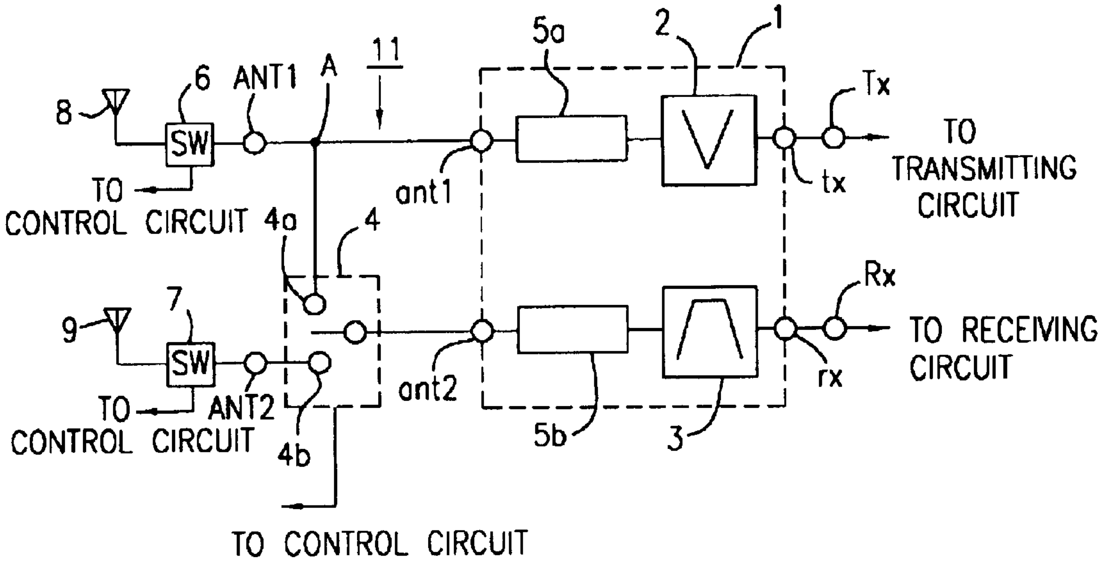
FIG. 1 is an electric circuit block diagram of a communication apparatus according to an embodiment of the present invention.

FIG. 1 is an electric circuit block diagram of a communication apparatus according to a first embodiment of the present invention and shows RF components for use in a diversity-enabled CDMA cellular telephone terminal device.

A filter assembly 11 includes a transmission filter 2, a reception filter 3, and phase circuits 5*a* and 5*b* (all of which comprise a filter 1), and a change-over switch 4. In the first embodiment, the transmission filter 2 and the reception filter 3 are implemented as a band-stop filter and a band-pass filter, respectively. The present invention, however, is not limited to the use of these specific filters.

A series circuit of the transmission filter 2 and the phase circuit 5*a* has ends ant1 and tx connected to an antenna terminal ANT1 and a transmission terminal Tx, respectively. A series circuit of the reception filter 3 and the phase circuit 5*b* has one end ant2 connected to an antenna terminal ANT2 via a change-over switch 4, and the other end rx connected to a reception terminal Rx.

A main antenna 8 is connected to the antenna terminal ANT1 via an on-off switch 6, and a diversity antenna 9 is connected to the antenna terminal ANT2 via an on-off switch 7. The transmission terminal Tx is connected to a transmitting circuit, and the reception terminal Rx is connected to a receiving circuit. The change-over switch 4 is switched to electrically connect the reception filter 3 to either the antenna terminal ANT1 or the antenna terminal ANT2. In other words, the main antenna 8 is connected to the transmission filter 2 via the on-off switch 6, and is also connected to the reception filter 3 via the on-off switch 6 and via the change-over switch 4. The diversity antenna 9 is connected to the reception filter 3 via the on-off switch 7 and via the change-over switch 4. The switches 4, 6, and 7 are each connected to a control circuit.

The effect of the thus constructed cellular telephone terminal device is now described.

Figure 2:
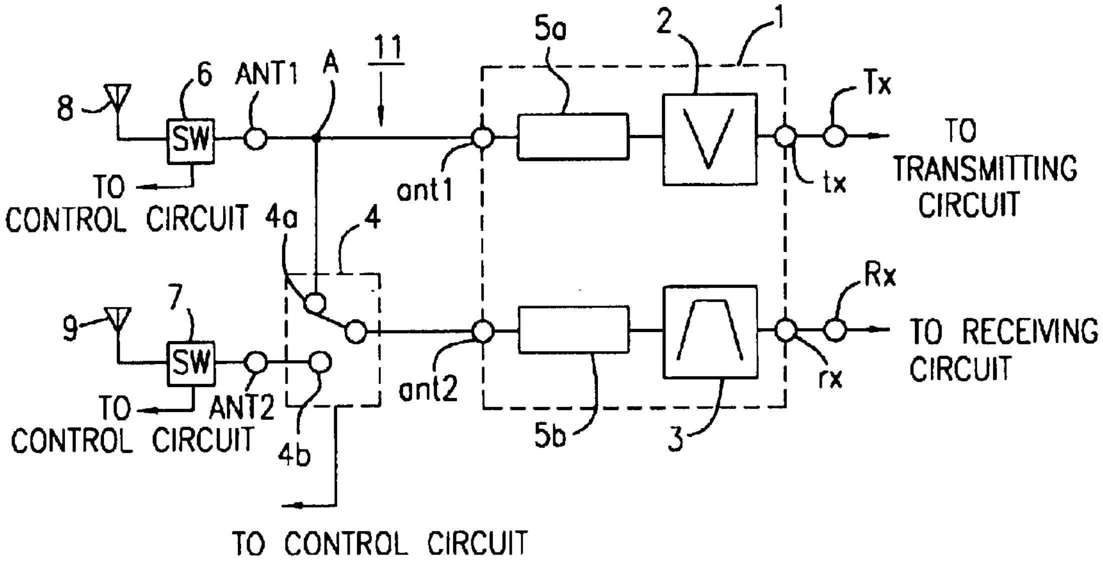
FIG. 2 is an electric circuit block diagram of the communication apparatus shown in FIG. 1, illustrating a switching operation of the change-over switch.

FIG. 2 shows that the filter assembly 11 functions as a shared antenna unit.

The change-over switch 4 is switched to a contact 4*a* so that the antenna terminal ANT1 of the filter assembly 11 is used as a terminal common to the transmission filter 2 and the reception filter 3. The phase circuit 5*a* is set so that, when viewing the transmission filter 2 from a node A between the antenna terminal ANT1, the phase circuit 5*a*, and the change-over switch 4, the impedance is open (i.e., high impedance) at the pass band of the reception filter 3. The phase circuit 5*b* is set so that, when viewing the reception filter 3 from the node A, the impedance is open at the pass band of the transmission filter 2. Thus, the main antenna 8, the transmission terminal Tx, and the reception terminal Rx are electrically connected to the antenna terminal ANT1, the transmitting circuit, and the receiving circuit, respectively, thereby allowing the filter assembly 11 to work as a shared antenna unit. Meanwhile, the reception filter 3 and the diversity antenna 9 are electrically separated from each other.

In the shared antenna unit 11, a transmission signal passed from the transmitting circuit to the transmission terminal Tx is output to the antenna terminal ANT1 via the transmission filter 2. The transmission signal output from the antenna terminal ANT1 is emitted from the main antenna 8. Also, when the change-over switch 4 is as shown on FIG. 2, a signal received by the main antenna 8 is input to the antenna terminal ANT1, and is then output from the reception terminal Rx to the receiving circuit via the reception filter 3.

Figure 3:
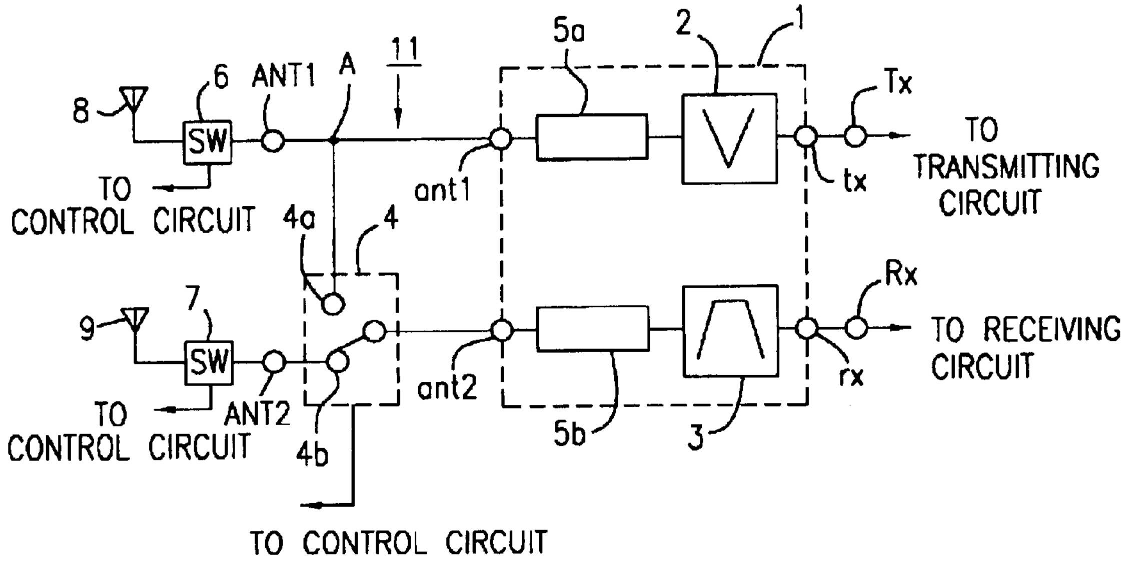
FIG. 3 is an electric circuit block diagram of the communication apparatus shown in FIG. 1, illustrating a switching operation of the change-over switch.

Referring now to FIG. 3, when the change-over switch 4 is switched to a contact 4*b*, the antenna terminals ANT1 and ANT2 of the filter assembly 11 are electrically connected to the transmission filter 2 and the reception filter 3, respectively. Then, the transmission filter 2 is connected to the main antenna 8, and the reception filter 3 is connected to the diversity antenna 9, thus allowing the filters to operate as independent filters.

A transmission signal supplied from the transmitting circuit to the transmission terminal Tx is passed to the antenna terminal ANT1 via the transmission filter 2, and is emitted from the main antenna 8. Also, when the change-over switch is as shown in FIG. 3, a signal received by the diversity antenna 9 is input to the antenna terminal ANT2, and is output to the receiving circuit from the reception terminal Rx via the reception filter 3.

The cellular telephone terminal device is capable of simultaneous transmission/reception communication in both cases shown in FIGS. 2 and 3, and is suitable for a diversity-enabled CDMA device. The number of stages in the reception filter 3 is always the same regardless of switching control of the change-over switch 4. Therefore, a cellular telephone terminal device having a filter characteristic optimum to a desired specification is achieved. Preferably, the constants of the phase circuits 5*a* and 5*b* are set so that the input/output impedance is 50Ω at the pass band of the associated filters 2 and 3 (in a normal 50-ohm transmission system), respectively, when the filters 2 and 3 operate as discrete filters (see FIG. 3), and are also preferably set so that the impedance is open at the pass bands of the opposite filters when the filters 2 and 3 operate as a shared antenna unit (see FIG. 2).

Figure 4:
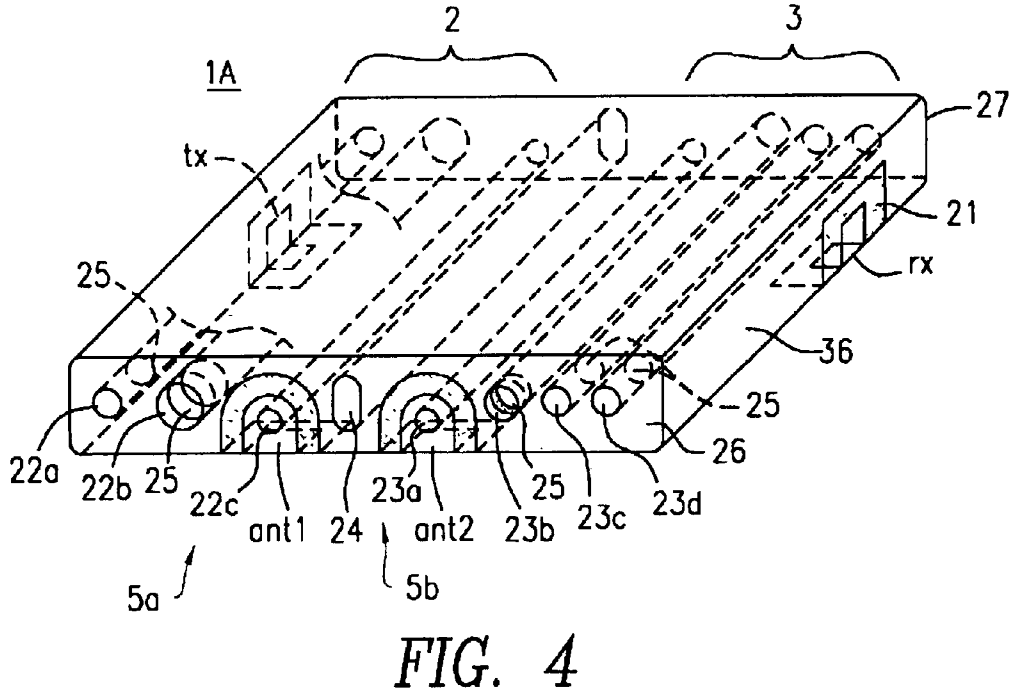
FIG. 4 is a perspective view of an exemplary filter used in the communication apparatus shown in FIG. 1.

FIG. 4 shows the structure of an exemplary filter 1A that is implemented as the filter 1 shown in FIG. 1. As shown in FIG. 4, the filter 1A is preferably formed of a rectangular dielectric block 21 including resonator holes 22*a* to 22*c* for the transmission filter 2, resonator holes 23*a* to 23*d* for the reception filter 3, and a ground hole 24. The transmission filter 2 comprises a three-stage band-stop filter, and the reception filter 3 comprises a four-stage band-pass filter.

The resonator holes 22*a* to 22*c* and 23*a* to 23*d*, and the ground hole 24 extend through the dielectric block 21 from the frontal surface 26 to the far surface 27 in FIG. 4. The holes 22*a* to 22*c*, 23*a* to 23*d*, and 24 each have a conductor formed over the internal wall surface thereof. The resonator holes 22*a* to 22*c* and 23*a* to 23*d* are straight holes with a constant inner diameter, but are not necessarily limited to this form, and may be stepped holes having different inner diameters at the front side and the far side. The holes 22*a* to 22*c*, 23*a* to 23*d*, and 24 may have any shape in cross section, and may be circular, elliptical, or rectangular in cross section.

The inner conductor on each of the resonator holes 22*a*, 22*b*, 23*b*, 23*c*, and 23*d* has a conductor-free portion 25 near an end thereof, and the conductor-free portion 25, which is electrically isolated from an outer conductor 36, serves as an open-circuit end. The other end of each inner conductor, which is opposite to the open end and which is electrically connected to the outer conductor 36, serves as a short-circuit end. A transmission electrode tx, a reception electrode rx, and antenna electrodes ant1 and ant2 are formed on exterior surfaces of the dielectric block 21. An outer conductor 36 is formed over substantially the entire exterior surfaces of the dielectric block 21, except for the transmission electrode tx, the reception electrode rx, and the antenna electrodes ant1 and ant2.

In the filter 1A, the transmission filter 2 is formed between the transmission electrode tx and the antenna electrode ant1, and the reception filter 3 is formed between the reception electrode rx and the antenna electrode ant2. The transmission filter 2 and the reception filter 3 are magnetically shielded from each other by the ground hole 24, thereby preventing unwanted electromagnetic coupling therebetween. The antenna electrodes ant1 and ant2 are positioned substantially side-by-side on the frontal surface 26 of the dielectric block 21 in FIG. 4, namely, in the vicinity of the change-over switch 4. This facilitates connection between the change-over switch 4 and the filter 1A. The resonator holes 22*c* and 23*a* have the functionality of the phase circuits 5*a* and 5*b*, respectively. The amount of shift in the phase circuits 5*a* and 5*b* is set by changing the pitch spacing between the resonator holes 22*c* and 22*b* or the pitch spacing between the resonator holes 23*a* and 23*b*, or by changing the diameter of the resonator holes 22*c* and 23*a*. The phase of the resonator holes 22*c* and 23*a* is rotated counterclockwise, and by a large amount, as the pitch spacing is narrowed.

Figure 5:
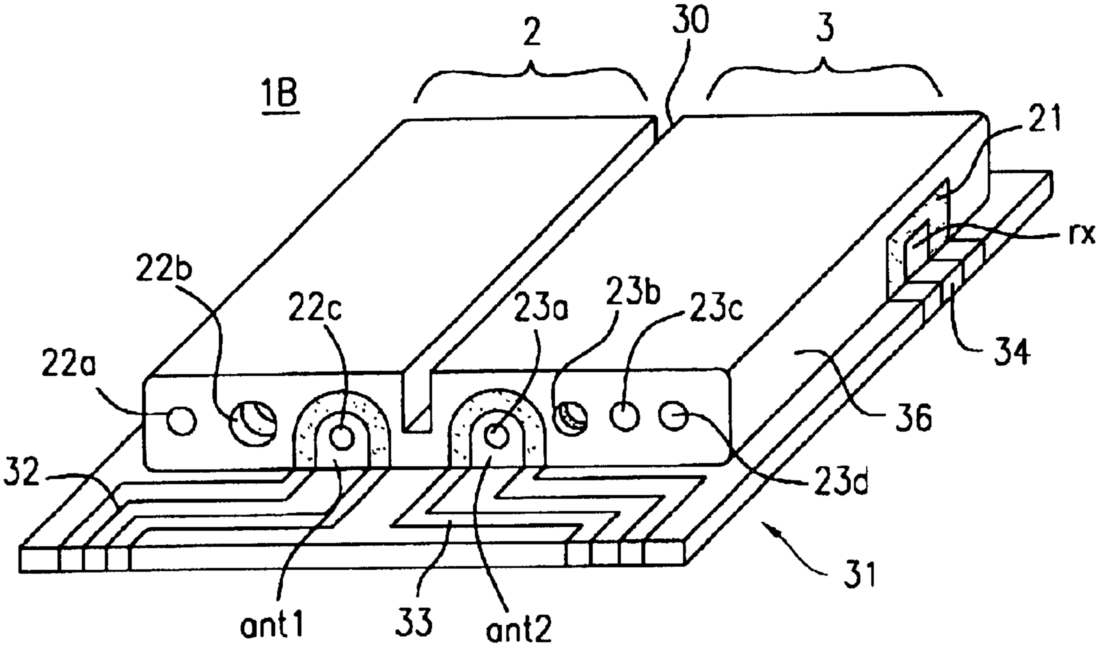
FIG. 5 is a perspective view of another exemplary filter used in the communication apparatus shown in FIG. 1.

FIG. 5 is a perspective view of another exemplary filter 1B that is implemented as the filter 1 shown in FIG. 1.

The filter 1B is substantially the same as the filter 1A shown in FIG. 4, except that the filter 1B includes a recess 30 having an internal wall surface covered with the outer conductor 36, in place of the ground hole 24. The recess 30 has the same function as that of the ground hole 24. Desirably, the recess 30 is formed in at least one of the upper and lower surfaces of the dielectric block 21.

The filter 1B further includes a base substrate 31 on which the dielectric block 21 is situated. The base substrate 31 is formed of a ceramic or resin double-sided substrate or multilayer substrate. Wiring patterns 32 and 33 formed on the base substrate 31 function as the phase circuits 5*a* and 5*b*, respectively. When the filters 2 and 3 operate as discrete filters, the dielectric constant of the base substrate 31, the thickness of the base substrate 31, the pattern width of the wiring patterns 32 and 33, and the like are adjusted so that the wiring patterns 32 and 33 preferably have an impedance of 50Ω at the pass bands of the associated filters 2 and 3, respectively. When the filters 2 and 3 operate as a shared antenna unit, the line width of the wiring patterns 32 and 33 is adjusted so that the impedance is open (i.e., high impedance) at the pass bands of the opposite filters.

The electrodes tx, rx, ant1, and ant2 of the filter 1B are led to desired positions through the wiring patterns 32 to 34 formed on the base substrate 31, thereby improving versatility in design of the cellular telephone terminal device.

Figure 6:
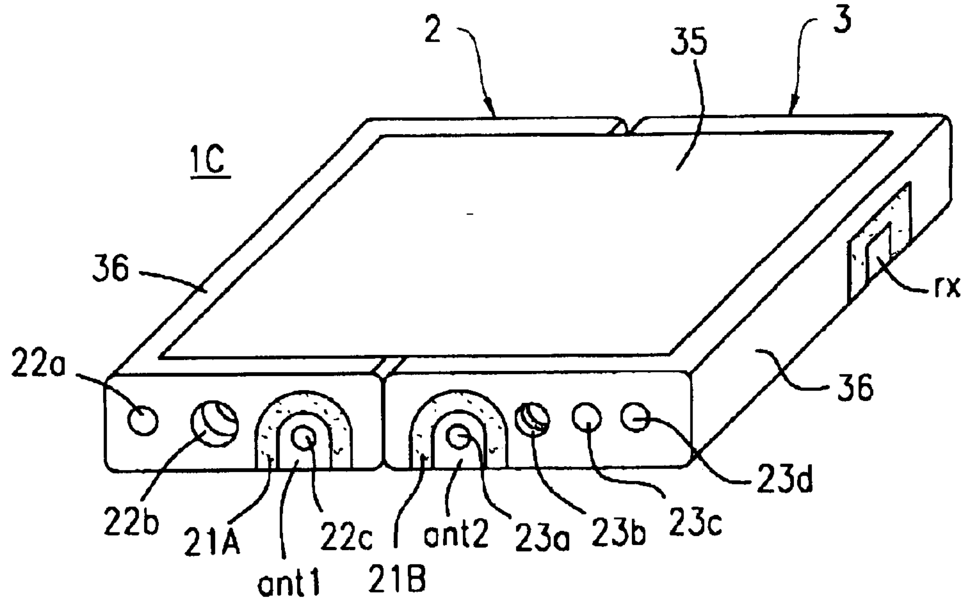
FIG. 6 is a perspective view of another exemplary filter used in the communication apparatus shown in FIG. 1.

FIG. 6 is a perspective view of another exemplary filter 1C that is implemented as the filter 1 shown in FIG. 1. The filter 1C includes separate dielectric blocks 21A and 21B having the transmission filter 2 and the reception filter 3 built therein, respectively. The transmission filter 2 and the reception filter 3 can be separately mounted on a substrate such as a printed circuit board, thus improving versatility in arrangement in the filter 1C. In FIG. 6, the transmission filter 2 and the reception filter 3 are bonded by an adhesive tape 35 into one unit. The adhesive tape 35 is affixed to at least one of the upper and lower surfaces of the filters 2 and 3. The adhesive techniques available may include, in addition to the adhesive tape 35, soldering, resin adhesives, and conductive paste. The adhesives may be conductive or non-conductive.

Second Embodiment

Figure 7:
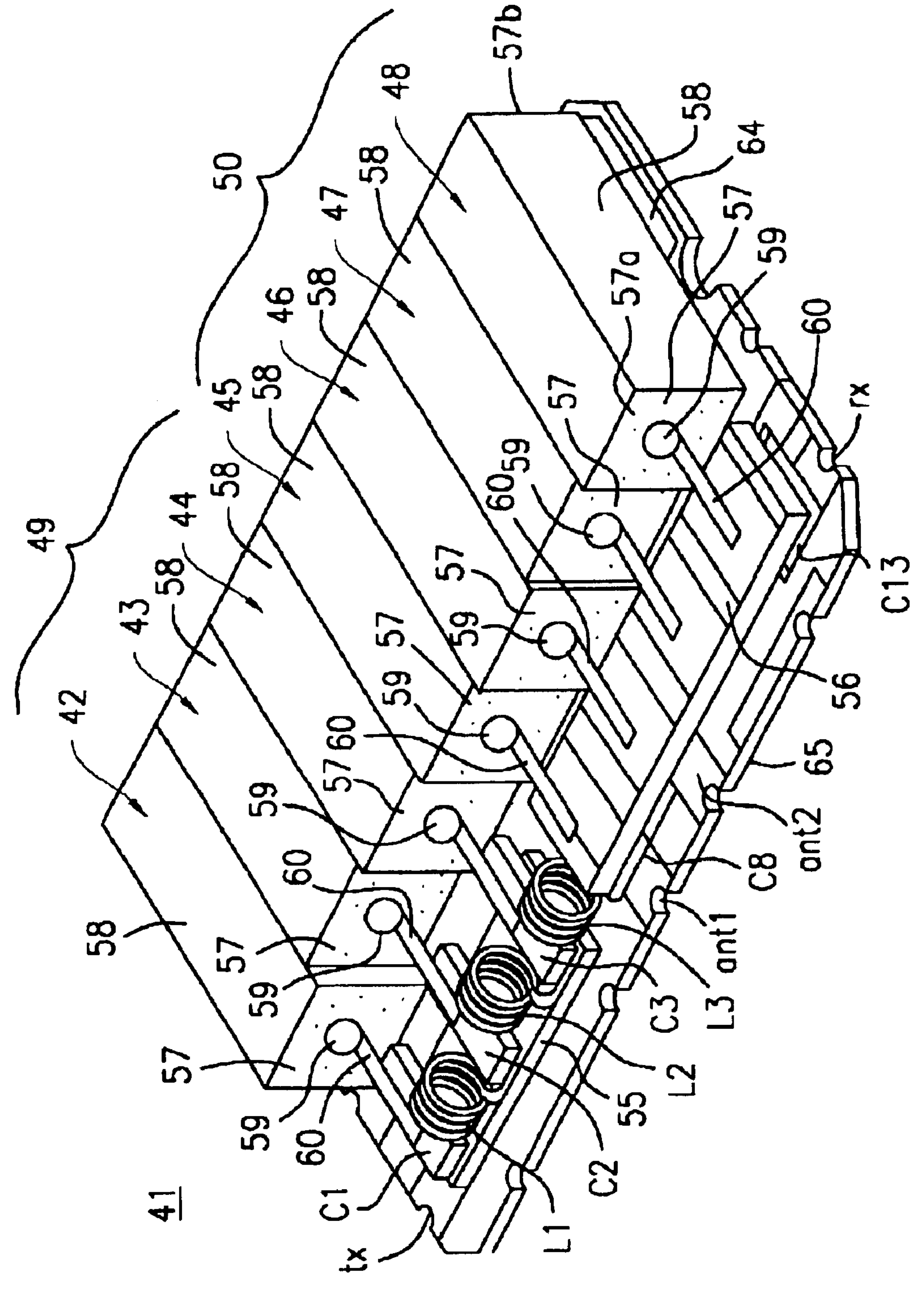
FIG. 7 is a perspective view of filters constituting a filter assembly according to a second embodiment of the present invention.

FIG. 7 is a perspective view of a filter 41 comprising a filter assembly according to a second embodiment of the present invention.

The filter 41 includes a base substrate 65 having components mounted thereon. The filter 41 includes a transmission filter 49 electrically connected between a transmission electrode tx and an antenna electrode ant1, and a reception filter 50 electrically connected between a reception electrode rx and an antenna electrode ant2. The transmission filter 49 includes resonators 42, 43, and 44, capacitors C1, C2, and C3, coils L1, L2, and L3, and a capacitor array substrate 55. The capacitor array substrate 55 has four capacitors C4 to C7 formed thereon. The reception filter 50 includes a coil L4 (not shown), resonators 45, 46, 47, and 48, capacitors C8 and C13, and a capacitor array substrate 56. The capacitor array substrate 56 has four capacitors C9 to C12 formed thereon.

The resonators 42 to 48 may be λ/4 coaxial dielectric resonators in the second embodiment. Each of the dielectric resonators 42 to 48 includes a tubular dielectric 57 made of a high-permittivity material such as a $TiO_2$ ceramic material, an outer conductor 58 formed on the external periphery of the tubular dielectric 57, and an inner conductor 59 formed on the inner periphery of the tubular dielectrics 57. The outer conductor 58 is electrically open (isolated) from each inner conductor 59 at one opening end surface (open end surface) 57*a* of each dielectric 57, and is electrically short-circuited (connected) to each inner conductor 59 at the other opening end surface (short-circuit end surface) 57*b* of each dielectric 57. The dielectric resonators 42 to 48 are electrically connected at the open end surfaces 57*a* to the capacitors C1 to C3, etc., via conductors 60. The dielectric resonators 42 to 48 are affixed into one unit by soldering on the outer conductor 58.

The transmission electrode tx, the antenna electrodes ant1 and ant2, and the reception electrode rx are formed at edges of the base substrate 65. Signal patterns or a ground electrode 64 are further formed on the upper surface of the base substrate 65. The resonators 42 to 48 are integrally affixed to the ground electrode 64 by soldering.

Figure 8:
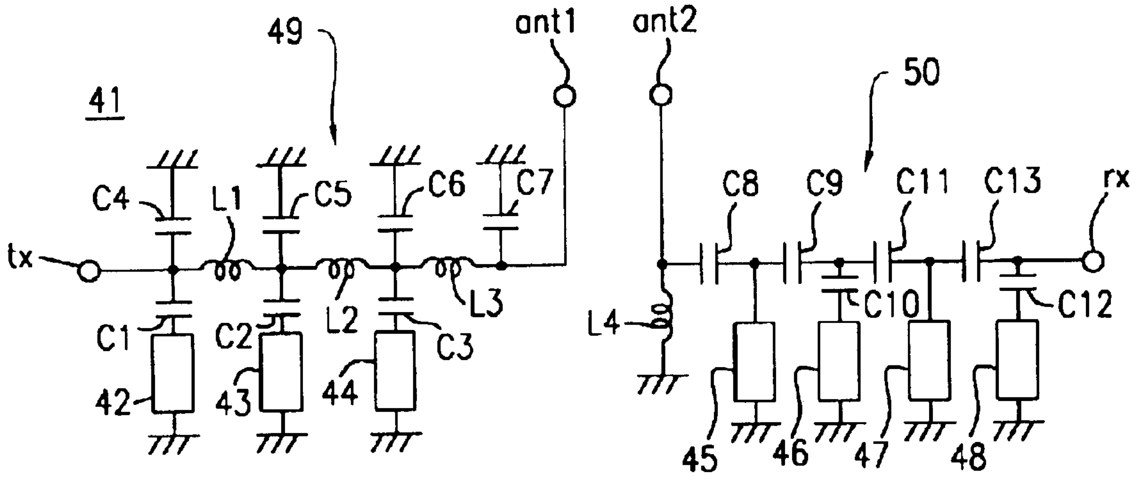
FIG. 8 is an electric circuit diagram of the filters shown in FIG. 7.

FIG. 8 is an electric circuit diagram of the filter 41. The transmission filter 49 is preferably a band-stop filter having three resonators coupled with each other. The resonator 42 is electrically connected to the transmission electrode tx via the resonant capacitor C1. A series resonant circuit of the resonator 42 and the resonant capacitor C1, a series resonant circuit of the resonator 43 and the resonant capacitor C2, and a series resonant circuit of the resonator 44 and the resonant capacitor C3 are electrically connected to each other via the coupling coils L1 and L2. The capacitors C4, C5, and C6 are electrically connected in parallel to these three series resonant circuits. The antenna electrode ant1 is electrically connected to the series resonant circuit of the resonator 44 and the capacitor C3 via a phase circuit formed of an L-type LC circuit consisting of the coupling coil L3 and the capacitor C7. The resonant capacitors C1 to C3 are capacitors upon which the amount of the stop-band attenuation depends.

The reception filter 50 is a band-pass filter having four resonant circuits coupled with each other. The resonator 45 is electrically connected to the antenna electrode ant2 via a phase circuit formed of an L-type LC circuit consisting of the coupling capacitor C8 and the coil L4. The resonator 45, a series resonant circuit of the resonator 46 and the resonant capacitor C10, the resonator 47, and a series resonant circuit of the resonator 48 and the resonant capacitor C12 are electrically connected to each other via the coupling capacitors C9, C11, and C13.

The above constructed filter 41 and a change-over switch (not shown) are electrically connected to each other so as to form the electric circuit shown in FIG. 1, thus constituting the filter assembly according to the second embodiment. The change-over switch performs switching control to electrically connect the antenna electrodes ant1 and ant2 of the filter 41 into a common terminal, thus allowing the filter assembly to function as a shared antenna unit. The change-over switch also performs switching control such that the antenna electrodes ant1 and ant2 are electrically isolated from each other, thus allowing the filter assembly to function as two independent filters (a transmission filter and a reception filter).

The phase circuit formed of the coil L3 and the capacitor C7, and the phase circuit formed of the coil L4 and the capacitor C8 are preferably set so as to have an impedance of 50Ω and to make impedance open (i.e., high impedance) at the pass bands of the opposite filters. The phase amount of the phase circuits should be set in consideration that the change-over switch itself may cause a phase rotation. If the change-over switch (gallium arsenide switch) causes a phase rotation by 30°, the constants of the coils L3 and L4, and the capacitors C7 and C8 should be set so that the phase circuits are rotated in phase by 150° (30°+150° rotation can make the impedance open). Without the phase circuits, the impedances of the opposite filters may be short-circuited. If the filter assembly is not used as a shared antenna unit, it should operate as two independent filters, and it is preferred to set the impedances at 50Ω.

Third Embodiment

Figure 9:
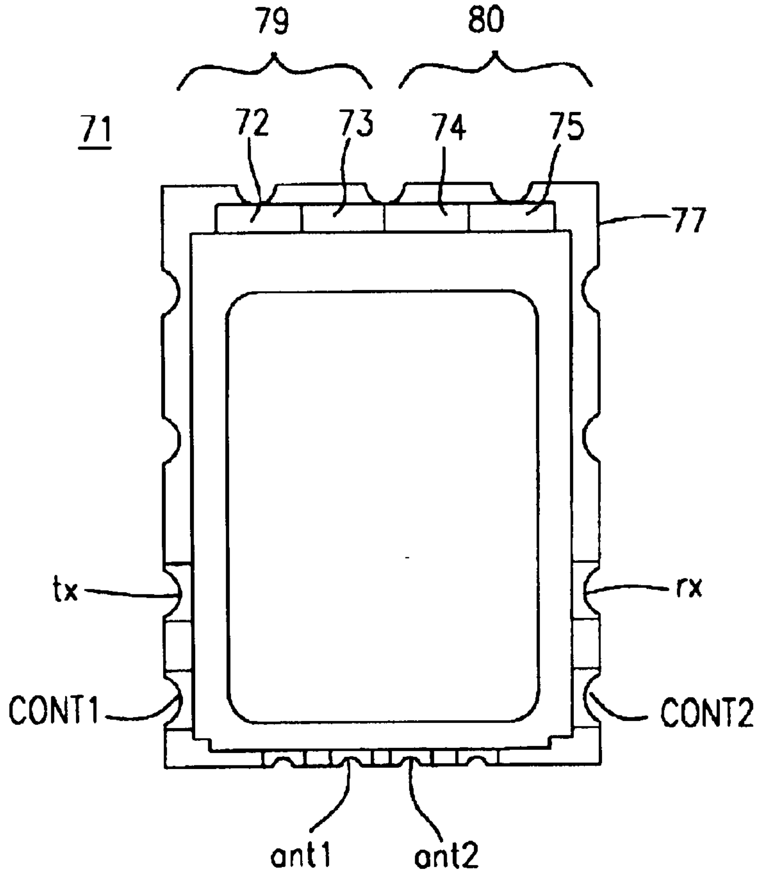
FIG. 9 is a plan view of filters forming a filter assembly according to a third embodiment of the present invention.

FIG. 9 is a plan view of a filter 71 comprising a filter assembly according to a third embodiment of the present invention. The filter 71 includes a base substrate 77 having components mounted thereon. The filter 71 includes a transmission filter 79 electrically connected between a transmission electrode tx and an antenna electrode ant1, and a reception filter 80 electrically connected between a reception electrode rx and an antenna electrode ant2.

Figure 10:
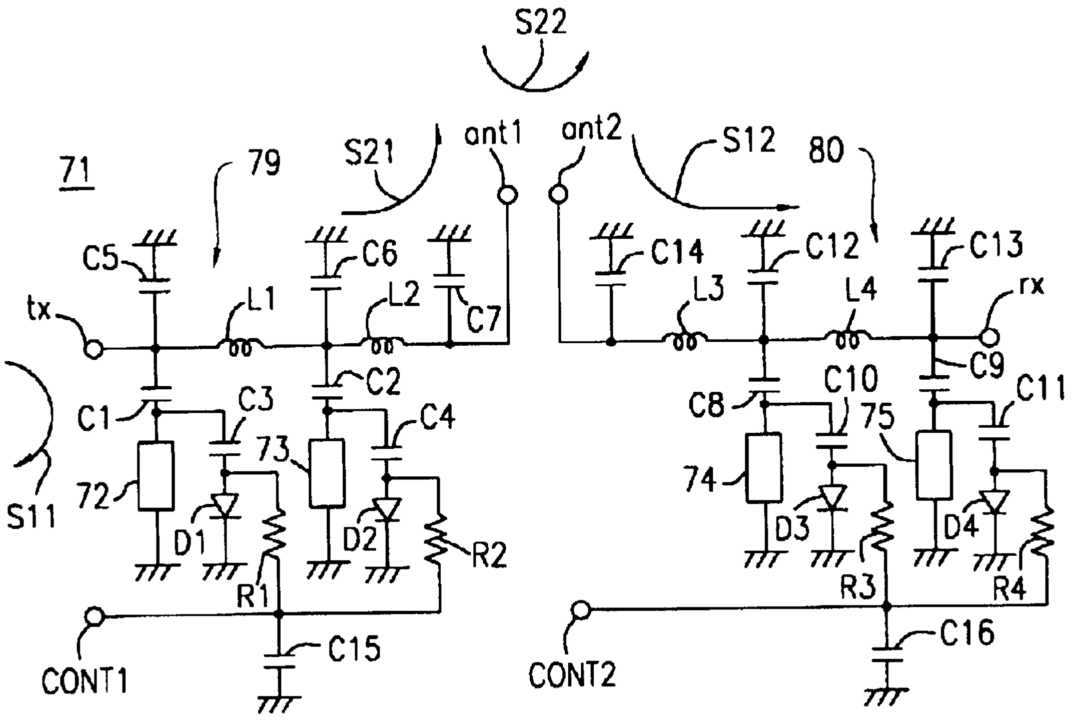
FIG. 10 is an electric circuit diagram of the filters shown in FIG. 9.

FIG. 10 is an electric circuit diagram of the filter 71. The transmission filter 79 is preferably a variable-frequency band-stop filter having two resonant circuits coupled with each other. The transmission filter 79 includes a resonator 72 electrically connected to the transmission electrode tx via a resonant capacitor C1, and a resonator 73 electrically connected to the antenna electrode ant1 via a resonant capacitor C2 and a phase circuit formed of a coil L2 and a capacitor C7. The resonant capacitors C1 and C2 are capacitors upon which the amount of the stop-band attenuation depends. A series resonant circuit of the resonator 72 and the resonant capacitor C1 is electrically connected to a series resonant circuit of the resonator 73 and the resonant capacitor C2 via a coupling coil L1. Preferably, capacitors C5 and C6 are electrically connected in a parallel to these two series resonant circuits.

A PIN diode D1 serving as a reactor, with the cathode of the diode D1 grounded, is preferably electrically connected, in parallel to the resonator 72, to a central node between the resonator 72 and the resonant capacitor C1 via a frequency-varying capacitor C3. A PIN diode D2 is preferably electrically connected, in a parallel to the resonator 73, to a central node between the resonator 73 and the resonant capacitor C2 via a frequency-varying capacitor C4. The frequency-varying capacitors C3 and C4 are capacitors for varying two attenuation pole frequencies of the attenuation characteristic of the variable-frequency band-stop filter 79.

A voltage-controlled electrode CONT1 is electrically connected to a central node between the anode of the PIN diode D1 and the frequency-varying capacitor C3 via a controlled-voltage supply resistor R1 and a capacitor C15. The voltage-controlled electrode CONT1 is further electrically connected to a central node between the anode of the PIN diode D2 and the frequency-varying capacitor C4 via a controlled-voltage supply resistor R2 and the capacitor C15.

The reception filter 80 is also preferably a variable-frequency band-stop filter having two resonant circuits coupled with each other. The reception filter 80 includes a resonator 74 electrically connected to an antenna electrode ant2 via a resonant capacitor C8 and a phase circuit formed of a coil L3 and a capacitor C14, and a resonator 75 electrically connected to the reception electrode rx via a resonant capacitor C9. A series resonant circuit of the resonator 74 and the resonant capacitor C8 is electrically connected to a series resonant circuit of the resonator 75 and the resonant capacitor C9 via a coupling coil L4. Capacitors C12 and C13 are electrically connected in a parallel to these series resonant circuits.

A PIN diode D3 serving as a reactance element, with the cathode of the diode D3 grounded, is preferably electrically connected, in parallel to the resonator 74, to a central node between the resonator 74 and the resonant capacitor C8 via a frequency-varying capacitor C10. A PIN diode D4 is preferably electrically connected, in parallel to the resonator 75, to a central node between the resonator 75 and the resonant capacitor C9 via a frequency-varying capacitor C11. The frequency-varying capacitors C10 and C11 are capacitors for varying two attenuation pole frequencies of the attenuation characteristic of the variable-frequency band-stop filter 80.

A voltage-controlled electrode CONT2 is electrically connected to a central node between the anode of the PIN diode D3 and the frequency-varying capacitor C10 via a controlled-voltage supply resistor R3 and a capacitor C16. The voltage-controlled electrode CONT2 is further electrically connected to a central node between the anode of the PIN diode D4 and the frequency-varying capacitor C11 via a controlled-voltage supply resistor R4 and the capacitor C16. The resonators 72 to 75 may be λ/4 coaxial dielectric resonators.

The operation of filter 71 will now be described.

The trap frequency of the transmission filter 79 depends upon the resonant frequencies of a resonant system formed of the frequency-varying capacitor C3, the resonant capacitor C1, and the resonator 72, and a resonant system formed of the frequency-varying capacitor C4, the resonant capacitor C2, and the resonator 73. When a positive voltage is applied as a controlled voltage to the voltage-controlled electrode CONT1, the PIN diodes D1 and D2 are turned on. Thus, the frequency-varying capacitors C3 and C4 are grounded via the PIN diodes D1 and D2, thus decreasing the two attenuation pole frequencies, thereby providing a low pass band for the transmission filter 79.

When a negative voltage is applied as a controlled voltage, the PIN diodes D1 and D2 are turned off. Alternatively, a control circuit for supplying a controlled voltage to the voltage-controlled electrode CONT1 may have an impedance as high as 100 kΩ or higher so that no voltage is applied to the voltage-controlled electrode CONT1, so that a zero-volt controlled voltage causes the PIN diodes D1 and D2 to be turned off. When the PIN diodes D1 and D2 are off, the frequency-varying capacitors C3 and C4 become open, thus increasing both attenuation pole frequencies, thereby providing a high pass band for the transmission filter 79. Accordingly, voltage control causes the frequency-varying capacitors C3 and C4 to be grounded or open, thereby providing two different pass-band characteristics for the transmission filter 79.

The reception filter 80 operates in the same way. Depending upon switching between high and low pass bands of the transmission filter 79, the reception filter 80 is voltage-controlled in such a manner that the bandpass frequency is reduced when the low frequency pass band is selected as the transmission band and the bandpass frequency is increased when the high frequency pass band is selected as the transmission band.

The filter 71 and a change-over switch (not shown) are electrically connected to each other to form the electric circuit shown in FIG. 1, thus comprising the filter assembly according to the third embodiment. The change-over switch performs switching control to electrically connect the antenna electrodes ant1 and ant2 of the filter 71 into a common terminal, thus allowing the filter assembly to function as a shared antenna unit. The change-over switch also performs switching control so that the antenna electrodes ant1 and ant2 are electrically isolated from each other, thus allowing the filter assembly to function as two independent filters (a transmission filter and a reception filter).

The phase circuit formed of the coil L2 and the capacitor C7, and the phase circuit formed of the coil L3 and the capacitor C14 are preferably set so as to have an impedances of 50Ω and to make impedance open (i.e., high impedance) at the pass bands of the opposite filters. The phase amount of the phase circuits are preferably set in consideration that the change-over switch itself may cause a phase rotation. Without the phase circuits, the impedances of the opposite filters are short-circuited. If the filter assembly is not used as a shared antenna unit, it should operate as two independent filters, and it is preferred to set the impedances at 50Ω.

Figure 11:
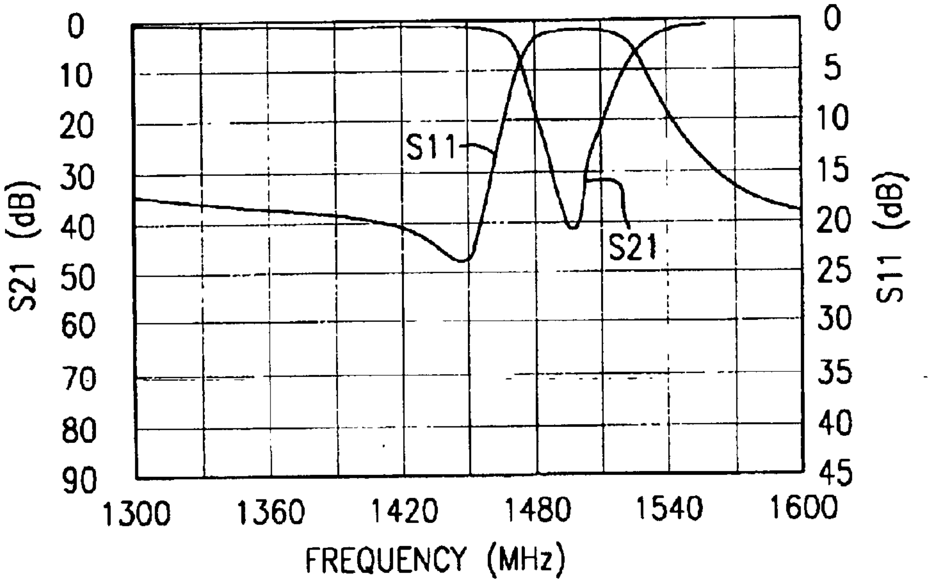
FIG. 11 is a graph showing the transmission and reflection characteristics of a transmission filter when the filter assembly according to the third embodiment operates as a shared antenna unit.
Figure 12:
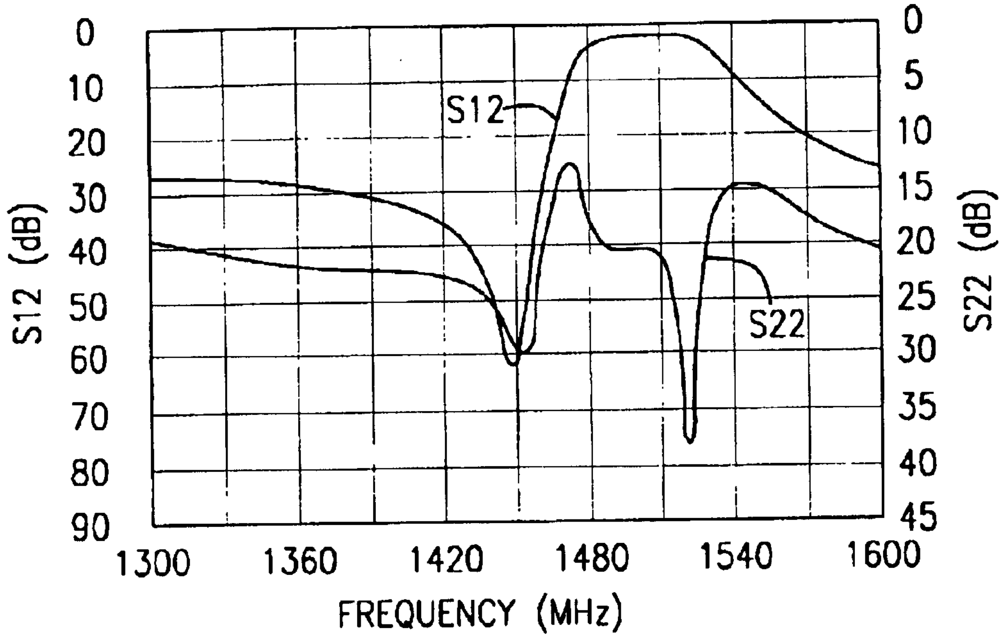
FIG. 12 is a graph showing the transmission and reflection characteristics of a reception filter when the filter assembly according to the third embodiment operates as a shared antenna unit.

FIG. 11 is a graph showing a measurement result of a transmission characteristic S21 and a reflection characteristic S11 of the transmission filter 79 when the antenna electrodes ant1 and ant2 are electrically connected into a common terminal to allow the filter assembly to function as a shared antenna unit. Likewise, FIG. 12 is a graph showing a measurement result of a transmission characteristic S12 and a reflection characteristic S22 of the reception filter 80 when the filter assembly operates as a shared antenna unit.

Figure 13:
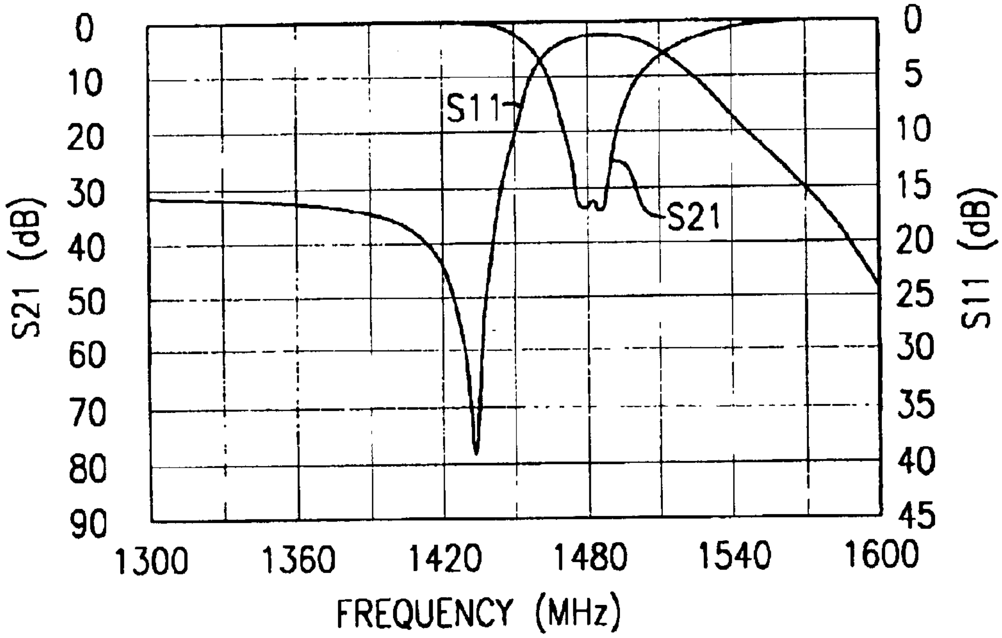
FIG. 13 is a graph showing the transmission and reflection characteristics of a transmission filter when the filter assembly according to the third embodiment operates as two independent filters.
Figure 14:
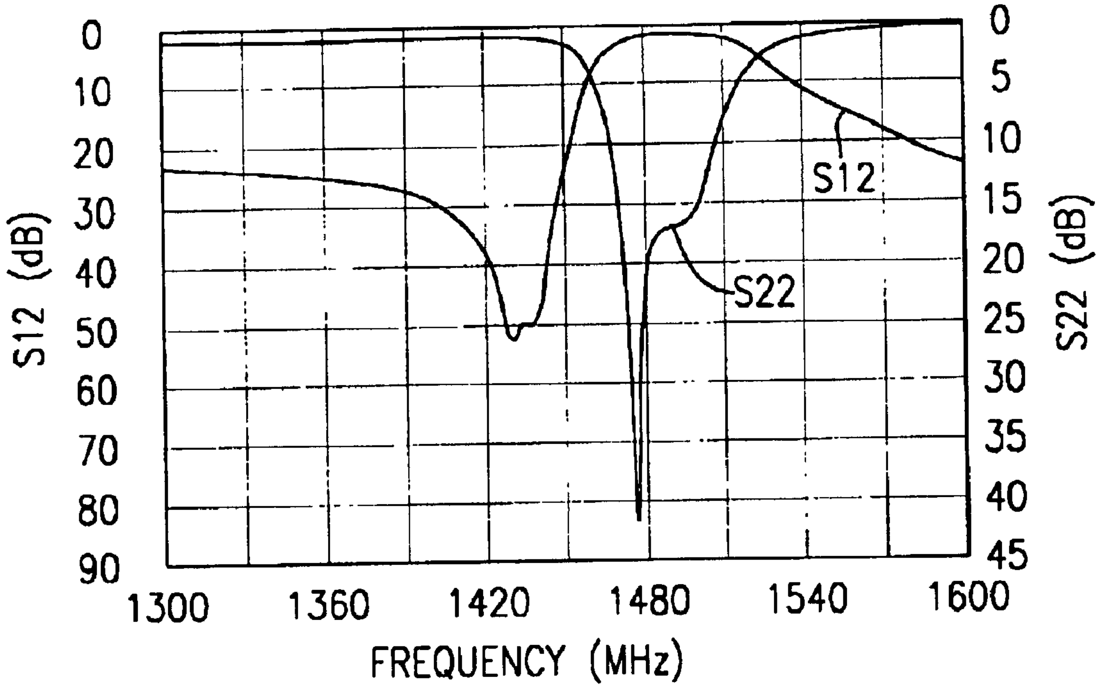
FIG. 14 is a graph showing the transmission and reflection characteristics of a reception filter when the filter assembly according to the third embodiment operates as two discrete filters.

FIG. 13 is a graph showing a measurement result of a transmission characteristic S21 and a reflection characteristic S11 of the transmission filter 79 when the antenna electrodes ant1 and ant2 are electrically isolated into discrete terminals to allow the transmission filter 79 and the reception filter 80 to function as two independent filters. Likewise, FIG. 14 is a graph showing a measurement result of a transmission characteristic S12 and a reflection characteristic S22 of the reception filter 80 when the transmission filter 79 and the reception filter 80 operate as two independent filters.

Fourth Embodiment

Figure 15:
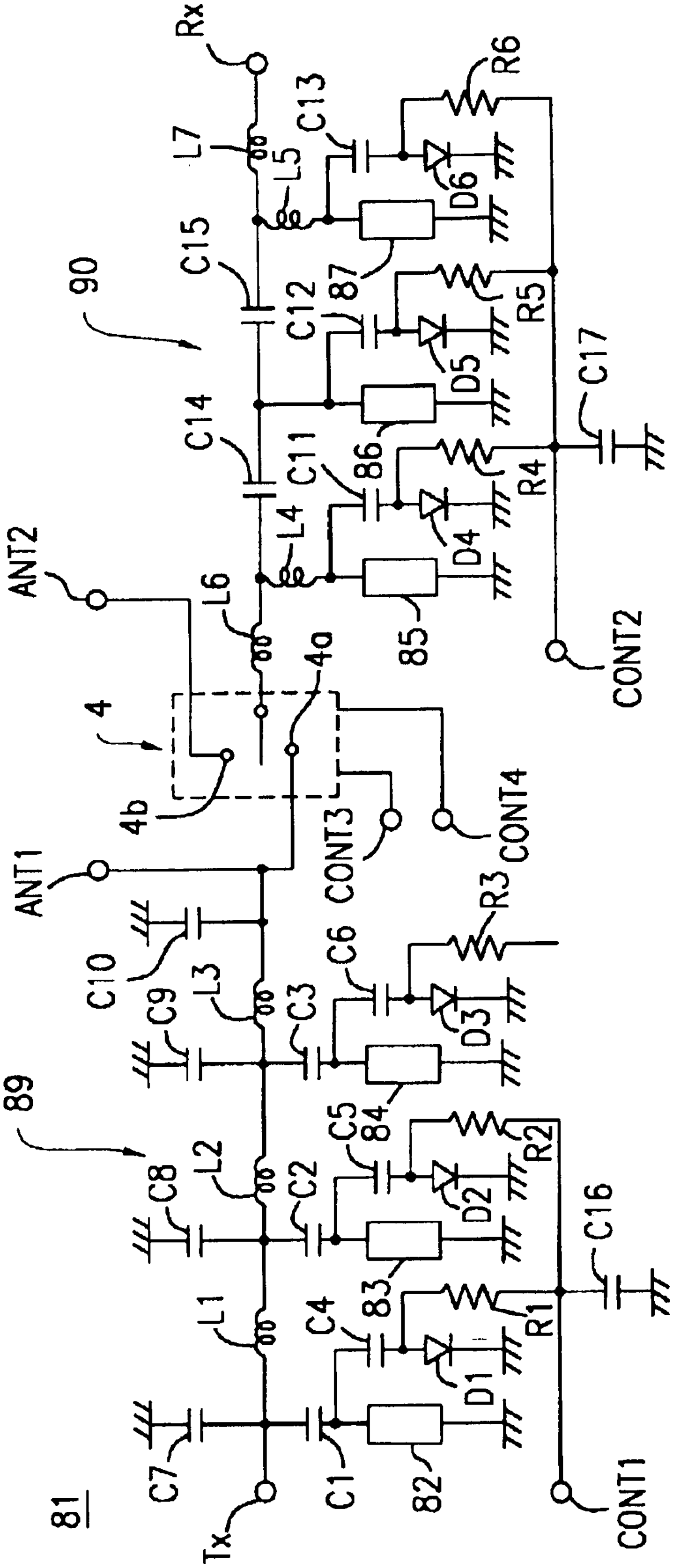
FIG. 15 is an electric circuit diagram of a filter assembly according to a fourth embodiment of the present invention.

Referring now to FIG. 15, a filter assembly 81 according to a fourth embodiment of the present invention includes a transmission filter 89, a reception filter 90, and a change-over switch 4. The transmission filter 89 is preferably a variable-frequency band-stop filter. The transmission filter 89 is preferably formed of three resonant circuits coupled with each other, and comprises a resonator 82 which is electrically connected to a transmission terminal Tx via a resonant capacitor C1, a resonator 84 which is electrically connected to an antenna terminal ANT1 via a matching coil L3 and a capacitor C10, and a resonator 83 connected between the resonators 82 and 84. The matching coil L3 serves as a reactance element suitable for phase synthesis between the transmission filter 89 and the reception filter 90. The resonant capacitors C1 to C3 are capacitors upon which the amount of the stop-band attenuation depends. A series resonant circuit of the resonator 82 and the resonant capacitor C1, a series resonant circuit of the resonator 83 and the resonant capacitor C2, and a series resonant circuit of the resonator 84 and the resonant capacitor C3 are electrically connected to each other via the coupling coils L1 and L2. Capacitors C7, C8, and C9 are electrically connected in parallel to these three series resonant circuits.

A PIN diode D1 serving as a reactance element is connected to a central node between the resonator 82 and the resonant capacitor C1 via a frequency-varying capacitor C4. A PIN diode D2 is connected to a central node between the resonator 83 and the resonant capacitor C2 via a frequency-varying capacitor C5. A PIN diode D3 is connected to a central node between the resonator 84 and the resonant capacitor C3 via a frequency-varying capacitor C6.

A voltage-controlled terminal CONT1 is electrically connected to a central node between the anode of the PIN diode D1 and the frequency-varying capacitor C4 via a controlled-voltage supply resistor R1 and a bypass capacitor C16. The voltage-controlled terminal CONT1 is further electrically connected to a central node between the anode of the PIN diode D2 and the frequency-varying capacitor C5 via a controlled-voltage supply resistor R2 and the bypass capacitor C16. The voltage-controlled terminal CONT1 is further electrically connected to a central node between the anode of the PIN diode D3 and the frequency-varying capacitor C6 via a controlled-voltage supply resistor R3 and the bypass capacitor C16.

A capacitor C10 is electrically connected between the ground and the antenna terminal ANT1. The capacitor C10 forms a T-type phase circuit in connection with the matching coil L3 for the transmission filter 89 and a matching coil L6 for the reception filter 90. The change-over switch 4 is connected between an antenna terminal ANT2 and the reception filter 90. When the change-over switch 4 is switched to a contact 4*a*, the reception filter 90 is electrically connected to the antenna terminal ANT1. When the change-over switch 4 is switched to a contact 4*b*, the reception filter 90 is electrically connected to the antenna terminal ANT2. In the fourth embodiment, the change-over switch 4 may be a gallium arsenide switch for switching control in response to a voltage control signal from a control circuit.

The T-type phase circuit is preferably set so as to have an impedance of 50Ω and to make impedance open (i.e., high impedance) at the pass band of the opposite filter. The phase amount of the T-type phase circuit is preferably set in consideration that the change-over switch 4 itself may cause a phase rotation. Without the T-type phase circuit, the impedance of the opposite filter is short-circuited. If the filter assembly 81 is not used as a shared antenna unit, it should operate as two independent filters, and it is preferred to set the impedances at 50Ω.

The reception filter 90 is preferably a variable-frequency band-pass filter. The reception filter 90 is preferably formed of three resonant circuits coupled with each other, and comprises of a resonator 85 which is electrically connected to the antenna terminal ANT2 via the change-over switch 4, a resonant coil L4, and the matching coil L6, a resonator 87 which is electrically connected to a reception terminal Rx via a resonant coil L5 and a matching coil L7, and a resonator 86 which is electrically connected between the resonators 85 and 87 via coupling capacitors C14 and C15.

A series circuit of a frequency-varying capacitor C11 and a PIN diode D4 is electrically connected, in a parallel to the resonator 85, to a central node between the resonator 85 and the resonant coil L4, with the cathode of the PIN diode D4 grounded. A series circuit of a frequency-varying capacitor C12 and a PIN diode D5 is electrically connected, in parallel to the resonator 86, to a central node between the resonator 86 and the coupling capacitors C14 and C15, with the cathode of the PIN diode D5 grounded. A series circuit of a frequency-varying capacitor C13 and a PIN diode D6 is electrically connected, in parallel to the resonator 87, to a central node between the resonator 87 and the resonant coil L5, with the cathode of the PIN diode D6 grounded.

A voltage-controlled terminal CONT2 is electrically connected to a central node between the anode of the PIN diode D4 and the frequency-varying capacitor C11 via a resistor R4 and a bypass capacitor C17. The voltage-controlled terminal CONT2 is further electrically connected to a central node between the anode of the PIN diode D5 and the frequency-varying capacitor C12 via a resistor R5 and the bypass capacitor C17. The voltage-controlled terminal CONT2 is further electrically connected to a central node between the anode of the PIN diode D6 and the frequency-varying capacitor C13 via a resistor R6 and the bypass capacitor C17. The resonators 82 to 87 may be λ/4 coaxial dielectric resonators.

The operation of the filter assembly 81 will now be described. The operation of the transmission filter 89 is not described since it is substantially the same as that of the third embodiment.

The bandpass frequency of the reception filter 90 that is a variable-frequency band-pass filter depends upon the resonant frequencies of a resonant system formed of the frequency-varying capacitor C11, the resonant coil L4, and the resonator 85, a resonant system formed of the frequency-varying capacitor C12 and the resonator 86, and a resonant system formed of the frequency-varying capacitor C13, the resonant coil L5, and the resonator 87. When a positive voltage is applied as a controlled voltage to the voltage-controlled terminal CONT2, the PIN diodes D4, D5, and D6 are turned on. Then, the frequency-varying capacitors C11, C12, and C13 are grounded via the PIN diodes D4, D5, and D6, thus decreasing the bandpass frequency.

When a negative voltage is applied as a controlled voltage, the PIN diodes D4, D5, and D6 are turned off. This makes the frequency-varying capacitors C11, C12, and C13 open, thus increasing the bandpass frequency. Accordingly, voltage control causes the frequency-varying capacitors C11 to C13 to be grounded or open, thereby providing two different pass-band characteristics for the reception filter 90.

Depending upon switching between high and low pass bands of the transmission filter 89, the reception filter 90 is voltage-controlled in such a manner that the bandpass frequency is reduced when the low frequency pass band is selected as the transmission band and the bandpass frequency is increased when the high frequency pass band is selected as the transmission band.

Accordingly, the antenna terminals ANT1 and ANT2 may be electrically connected into a common terminal, thus allowing the filter assembly 81 to function as a shared antenna unit, or the antenna terminals ANT1 and ANT2 may be electrically isolated from each other into discrete terminals, thus allowing the filter assembly 81 to function as two independent filters (a transmission filter and a reception filter).

Other Embodiments

The filter assembly and the communication apparatus according to the present invention are not limited to the foregoing embodiments, and a variety of modifications and changes may be made without departing from the spirit and scope of the invention. For example, in the third and fourth embodiments, the reactance elements may be variable-capacitance diodes, field-effect transistors, or the like, in substitution for the PIN diodes.

While the filter assembly according to the foregoing embodiments includes the change-over switch 4, the change-over switch 4 need not be included. In other words, a filter assembly which does not include the change-over switch 4 may be mounted on a circuit board of a cellular telephone having the change-over switch 4.

What is claimed is:

1. A filter assembly comprising:

a first filter;

a second filter;

first and second input/output terminals electrically connected to first and second input/output ends of said first filter, respectively; and third and fourth input/output terminals electrically connected to first and second input/output ends of said second filter, respectively, wherein said filter assembly is externally connected to a change-over switch for switching between a first state where the first input/output terminal connected to said first filter is electrically connected to the third input/output terminal connected to said second filter so that said first filter and said second filter are combined into a single filter, and a second state where the first input/output terminal connected to said first filter is electrically isolated from the third input/output terminal connected to said second filter so that said first filter and said second filter operate as two discrete filters.

2. A filter assembly comprising:

a first filter;

a second filter;

a change-over switch;

first and second input/output terminals electrically connected to first and second input/output ends of said first filter, respectively;

a third input/output terminal electrically connected to a first input/output end of said second filter via said change-over switch; and a fourth input/output terminal electrically connected to a second input/output end of said second filter, wherein said change-over switch performs switching control to electrically connect said second filter to one of the first input/output terminal and the third input/output terminal, thereby switching between a first state where the first input/output terminal is electrically connected to said first filter and said second filter so that said first filter and said second filter operate as a single filter using the first input/output terminal as a common terminal, and a second state where said second filter is electrically connected to the third input/output terminal so that said first filter and said second filter operate as two discrete filters.

3. A filter assembly comprising:

a first filter;

a second filter;

a change-over switch;

first and second input/output terminals electrically connected to first and second input/output ends of said first filter, respectively;

a third input/output terminal electrically connected to a first input/output end of said second filter via said change-over switch; and a fourth input/output terminal electrically connected to a second input/output end of said second filter, wherein said change-over switch performs switching control to electrically connect said second filter to one of the first input/output terminal and the third input/output terminal, thereby switching between a first state where the first input/output terminal is electrically connected to said first filter and said second filter so that said first filter and said second filter operate as a single filter using the first input/output terminal as a common terminal, and a second state where said second filter is electrically connected to the third input/output terminal so that said first filter and said second filter operate as two discrete filters, and wherein said change-over switch comprises a gallium arsenide switch.

4. A filter assembly according to claim 1, further comprising a phase circuit electrically connected to at least one of said first filter and said second filter.

5. A filter assembly comprising:

a first filter;

a second filter;

first and second input/output terminals electrically connected to first and second input/output ends of said first filter, respectively; and third and fourth input/output terminals electrically connected to first and second input/output ends of said second filter, respectively, wherein said filter assembly is externally connected to a change-over switch for switching between a first state where the first input/output terminal connected to said first filter is electrically connected to the third input/output terminal connected to said second filter so that said first filter and said second filter are combined into a single filter, and a second state where the first input/output terminal connected to said first filter is electrically isolated from the third input/output terminal connected to said second filter so that said first filter and said second filter operate as two discrete filters, and wherein said first filter and said second filter are built in a single dielectric block.

6. A filter assembly according to claim 5, wherein the dielectric block has a ground hole formed between said first filter and said second filter.

7. A filter assembly according to claim 5, wherein the dielectric block has a recess formed in a surface thereof so as to extend between said first filter and said second filter, the recess having an internal wall surface covered with a conductor.

8. A filter assembly according to claim 1, wherein said first filter and said second filter are built in first and second separate dielectric blocks, respectively.

9. A filter assembly comprising:

a first filter;

a second filter;

first and second input/output terminals electrically connected to first and second input/output ends of said first filter, respectively; and third and fourth input/output terminals electrically connected to first and second input/output ends of said second filter, respectively, wherein said filter assembly is externally connected to a change-over switch for switching between a first state where the first input/output terminal connected to said first filter is electrically connected to the third input/output terminal connected to said second filter so that said first filter and said second filter are combined into a single filter, and a second state where the first input/output terminal connected to said first filter is electrically isolated from the third input/output terminal connected to said second filter so that said first filter and said second filter operate as two discrete filters, wherein said first filter and said second filter are built in first and second separate dielectric blocks, respectively, and wherein the first dielectric block and the second dielectric block are combined into a single block by adhesive means.

10. A filter assembly comprising:

a first filter;

a second filter;

first and second input/output terminals electrically connected to first and second input/output ends of said first filter, respectively; and third and fourth input/output terminals electrically connected to first and second input/output ends of said second filter, respectively, wherein said filter assembly is externally connected to a change-over switch for switching between a first state where the first input/output terminal connected to said first filter is electrically connected to the third input/output terminal connected to said second filter so that said first filter and said second filter are combined into a single filter, and a second state where the first input/output terminal connected to said first filter is electrically isolated from the third input/output terminal connected to said second filter so that said first filter and said second filter operate as two discrete filters, and wherein at least one of said first filter and said second filter includes a coaxial dielectric resonator.

11. A filter assembly according to claim 10, wherein at least one of said first filter and said second filter further includes a variable-frequency resonant circuit having a reactance element which is voltage-controlled and electrically connected to the coaxial dielectric resonator.

12. A filter assembly according to claim 11, wherein the reactance element comprises one of a PIN diode and a variable-capacitance diode.

13. A filter assembly comprising:

a first filter;

a second filter;

first and second input/output terminals electrically connected to first and second input/output ends of said first filter, respectively;

third and fourth input/output terminals electrically connected to first and second input/output ends of said second filter, respectively; and a base substrate on which said first filter and said second filter are fixed, wherein said filter assembly is externally connected to a change-over switch for switching between a first state where the first input/output terminal connected to said first filter is electrically connected to the third input/output terminal connected to said second filter so that said first filter and said second filter are combined into a single filter, and a second state where the first input/output terminal connected to said first filter is electrically isolated from the third input/output terminal connected to said second filter so that said first filter and said second filter operate as two discrete filters.

14. A filter assembly comprising:

a first filter;

a second filter;

first and second input/output terminals electrically connected to first and second input/output ends of said first filter, respectively; and third and fourth input/output terminals electrically connected to first and second input/output ends of said second filter, respectively, wherein said filter assembly is externally connected to a change-over switch for switching between a first state where the first input/output terminal connected to said first filter is electrically connected to the third input/output terminal connected to said second filter so that said first filter and said second filter are combined into a single filter, and a second state where the first input/output terminal connected to said first filter is electrically isolated from the third input/output terminal connected to said second filter so that said first filter and said second filter operate as two discrete filters, and wherein the first input/output end of said first filter which is connected to the first input/output terminal, and the first input/output end of said second filter which is connected to the third input/output terminal are positioned side-by-side in the vicinity of said change-over switch.

15. A communication apparatus comprising the filter assembly according to claim 1.

16. A communication apparatus comprising:

a first filter;

a second filter;

a change-over switch;

a first antenna electrically connected to said first filter; and a second antenna electrically connected to said second filter via said change-over switch, wherein said change-over switch performs switching control to electrically connect said second filter to one of said first antenna and said second antenna, thereby switching between a first state where said first antenna is electrically connected to said first filter and said second filter so that said first filter and said second filter operate as a single filter using said first antenna as a common antenna, and a second state where said second filter is electrically connected to said second antenna so that said first filter and said second filter operate as two discrete filters.

* * * * *